United States Patent [19]

Joyce

[11] Patent Number: 5,682,664
[45] Date of Patent: Nov. 4, 1997

[54] PRESSURE SWITCH MOUNTING

[75] Inventor: Ronald S. Joyce, Elk Grove Village, Ill.

[73] Assignee: Eaton Corporation, Cleveland, Ohio

[21] Appl. No.: 253,462

[22] Filed: Jun. 3, 1994

[51] Int. Cl.[6] .................................................. B23P 11/00
[52] U.S. Cl. .......................... 29/453; 29/622; 200/296; 200/83 R
[58] Field of Search ..................... 29/453, 513, 525.1, 29/622, 525.01; 200/83 R, 83 WM, 296; 68/12.27, 12.05; 134/56 D, 57 D, 58 D

[56] References Cited

U.S. PATENT DOCUMENTS

| | | | |
|---|---|---|---|
| 3,450,854 | 6/1969 | Simmons | 200/83 WM |
| 5,187,338 | 2/1993 | Kaigler | 200/83 R |
| 5,256,841 | 10/1993 | Zanella | 200/296 |
| 5,336,858 | 8/1994 | Kaigler | 200/83 R |
| 5,350,140 | 9/1994 | Ripley et al. | 200/296 X |

*Primary Examiner*—S. Thomas Hughes
*Attorney, Agent, or Firm*—Roger A. Johnston

[57] ABSTRACT

A panel-mountable pressure switch having an external adjustment lever has a mounting bracket with a right-angled flange attached to the switch housing. The bracket has a cam shaft rotatably mounted on the bracket for adjusting the lever position with the end of the shaft extending outwardly through the bracket flange. The panel has a non-circular aperture formed therein and a plurality of tabs formed on the bracket flange are inserted into the aperture and the bracket is rotated to secure the flange against he surface of the panel. A releasable locking tab on the bracket flange snaps into a separate aperture recess formed in the panel to prevent reverse rotation of the bracket and removal without user depression of the locking tab.

5 Claims, 1 Drawing Sheet

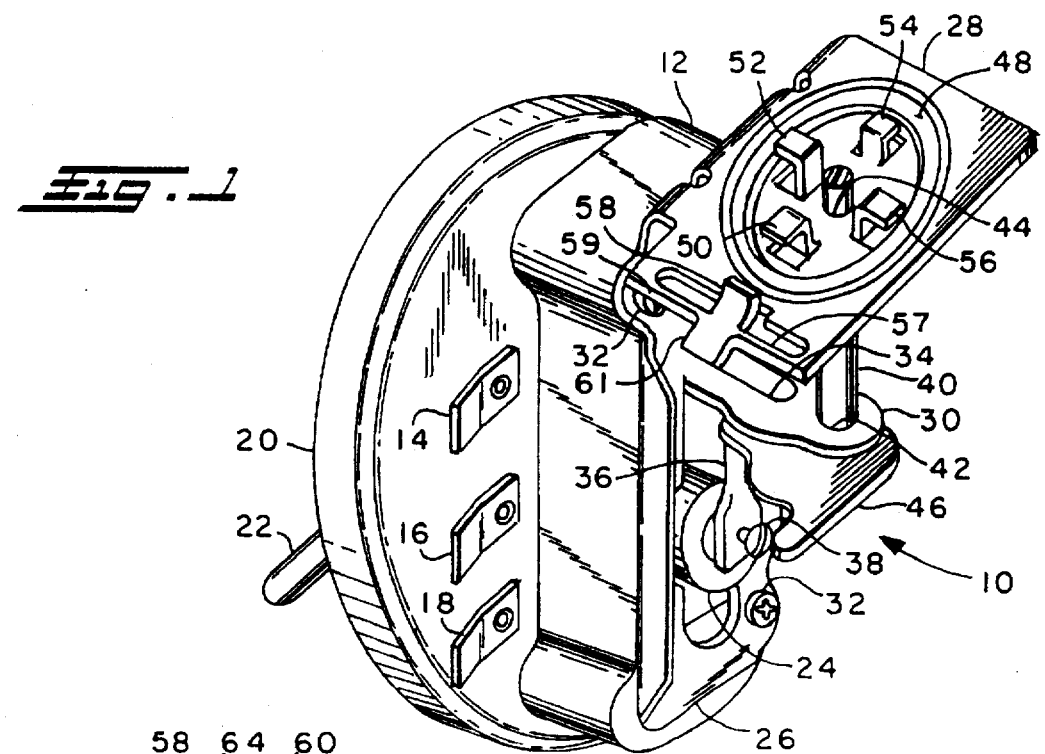
Fig. 1
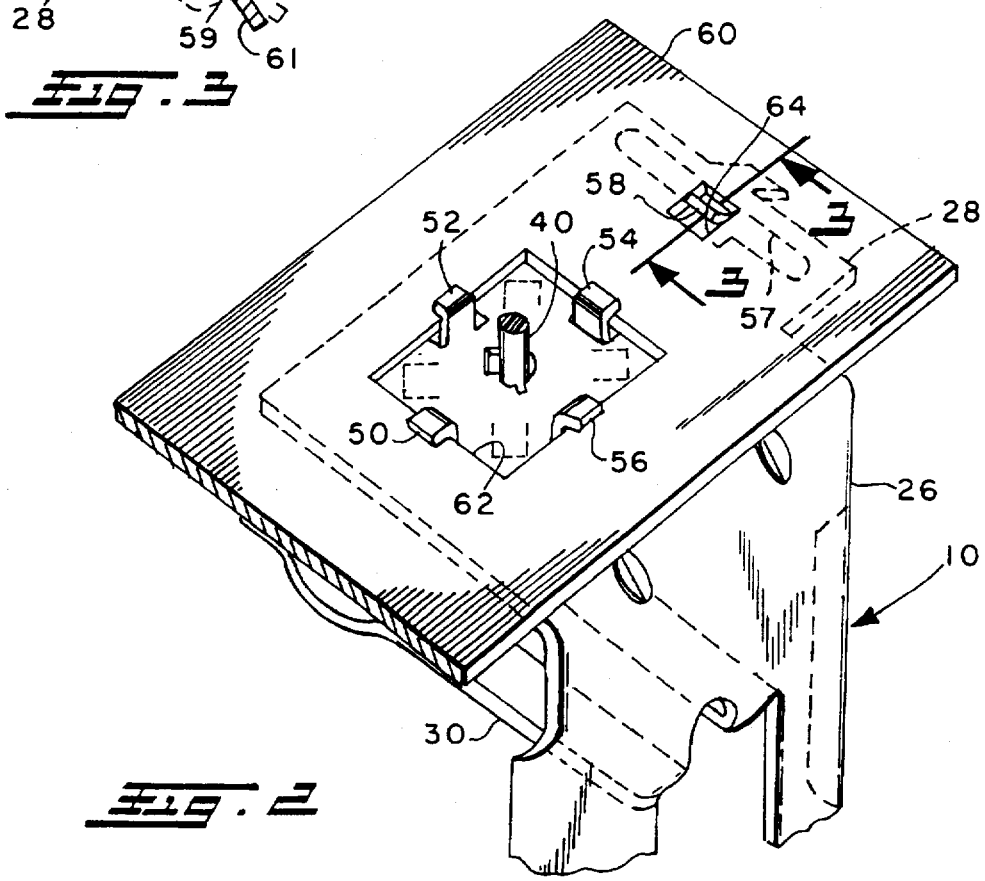
Fig. 2
Fig. 3

PRESSURE SWITCH MOUNTING

BACKGROUND OF THE INVENTION

The present invention relates to mounting of pressure switches for controlling selected functions in an appliance and to the mounting of the pressure switch on a panel or control console. Pressure switches are typically employed in appliances such as dishwashers and clothes washing machines to sense the water level head and to provide an electrical control function in response to a predetermined sensed pressure head. In particular, pressure switches are employed in such appliances to shut off the electrically actuated water inlet valve for stopping water flow into the appliance.

Heretofore, pressure switches employed in the aforesaid type of appliances have been provided with a user accessible adjustment knob or lever to change the pressure head setting at which the switch is actuated for varying the program functions of the appliance. Typically, in washing machine and dishwasher pressure switch applications, the pressure switch is mounted on a panel on the front of the control console and the knob or lever actuates a cam which moves an adjustment member for varying the preload of a spring on the pressure sensing diaphragm in the pressure switch. It has been common practice to manufacture pressure switches for such appliances by having a molded plastic body containing the electrical switching mechanism and forming therewith a cavity for attachment of the diagram thereto with a cover thereover forming, on one side of the diaphragm, a pressure sensing cavity. A mounting bracket is typically attached to the pressure switch body for mounting the pressure switch on the panel. This arrangement has permitted the user actuated adjustment cam to be mounted on the bracket and the switch and adjustment cam mechanism calibrated prior to installation of the assembly on the control panel of the appliance.

Heretofore, appliance pressure switches have been attached to a mounting bracket and the bracket secured to the appliance panel or control console by means of engagement by a tab provided on the mounting bracket, with holes punched in the panel and the bracket secured by fasteners threaded into the panel holes. This arrangement has proven to be somewhat time consuming and costly in high volume production of household appliances. It has therefore been desirable to provide a simple, reliable and low cost way or means of attaching an adjustable pressure switch to a panel and to provide user access through the panel to the adjustment mechanism of the pressure switch.

SUMMARY OF THE INVENTION

It is an object of the present invention to provide for mounting of a pressure switch assembly on one side of a panel through an aperture without the need for separate fastening means and for user access to the pressure switch adjustment from the opposite side of the panel.

It is a further object of the present invention to provide for mounting a pressure switch assembly on an appliance panel by inserting portions of the pressure switch mounting bracket through an aperture from one side of the panel and rotating and locking the assembly into position and to permit the user to access the pressure switch adjusting mechanism from the opposite side the panel.

It is a further object of the present invention to provide a pressure switch with a movable adjustment member thereon and with a mounting bracket attached with an adjustment cam and to provide for twist lock tabs or projections on the mounting bracket to enable the mounting bracket to be inserted and rotated and locked therein from one side of a panel with the adjustment cam accessible from the opposite side of the panel.

It is another object of the present invention to provide for mounting a pressure switch on a panel by providing a mounting bracket attached to the pressure switch with a cam shaft rotatably mounted on the bracket which has a flange with a plurality of tabs formed thereon and which are inserted from one side of the panel and rotated and locked in a non-circular aperture formed in a panel on the appliance with the cam shaft extending through the aperture to enable user adjustment of the pressure switch from the other side of the panel.

The pressure switch assembly of the present invention employs a bracket having a flange portion with an adjustment cam rotatably mounted thereon for enabling adjustment of the position of a lever for varying the setting at which the pressure switch actuates the internal electrical switching mechanism. The bracket has a plurality of tabs formed thereon with the cam shaft extending through the bracket flange with the tabs surrounding the shaft; and, the tabs are inserted in a non-circular aperture formed in the appliance panel and the bracket is rotated effecting locking of the tabs against the surface of the panel. When the tabs are locked against the surface of the panel, another tab on the bracket releasably engages an auxiliary recess or aperture in the panel for locking the bracket against subsequent rotation. The present invention thus provides an unique and economical way of attaching a pressure switch assembly to one side of a panel without the need of separate fastening means and permits user adjustment of the pressure switch from the opposite side of the panel.

BRIEF DESCRIPTION OF THE DRAWINGS

FIG. 1 is an axonometric view of a pressure switch assembly prior to mounting on an appliance panel;

FIG. 2 is an axonometric view of a portion of an appliance panel with the assembly of FIG. 1 mounted thereon; and, FIG. 3 is a portion of a section view taken along section-indicating lines 3—3 of FIG. 2.

DETAILED DESCRIPTION

Referring to FIG. 1, the pressure switch assembly indicated generally at 10 includes a molded plastic body 12 which houses internally therein (not shown) an electrical switching mechanism which is connected to external connector terminals denoted by reference numerals 14, 16, 18 typically for performing one or more switching functions.

The pressure switch has a clamping band 20 which retains a cover portion not visible in FIG. 1 over the unshown pressure sensing diaphragm which defines a sensing cavity in the switch. A fitting 22 is shown which is attached to and extends from the cover for connection to the pressure sensing cavity as is well known in the art.

The pressure switch has an external plunger 24 extending outwardly from the body 12 which is movable for adjusting the preload of an internal spring (not shown) for varying the force of the internal diaphragm as is also well known in the art.

A mounting bracket 26 has a flange portion 28 formed generally at right angles thereto which is configured for mounting on a panel, such as a washing machine control panel. A tab or flange portion is stamped from bracket 26 and bent to a position generally parallel with the flange 28; and, the auxiliary tab or flange is denoted by reference numeral 30. The bracket 26 is attached to the housing 12 by suitable fasteners such as self-tapping screws 32.

Auxiliary flange 30 has a slot 34 formed therein and through which extends a lever or arm 36 having one end registered against the end of adjustment plunger 24 and the opposite end attached to the under surface of the flange 28. An adjustment screw 38 is provided in the end of the arm 36 for calibration purposes.

A cam shaft 40 has one end thereof journaled in an aperture 42 in auxiliary bracket flange 30; and, the opposite end of cam shaft 40 is journaled through an aperture 44 formed in the mounting flange 28. An adjustment cam member 46 is attached to the end of cam shaft 40 and has lobes therein for contacting the arm 36 for adjusting the position of the arm upon rotation of the shaft 40 and cam 46.

Mounting flange 28 has an annular rib 48 formed therein for providing stiffening thereof and a registration surface for mounting in a panel as will hereinafter be described.

A plurality of mounting tabs preferably four in number are formed on the flange 28 within the annular rib 48 as denoted by reference numerals 50, 52, 54, 56. Auxiliary locating tab 58 is also formed on flange 28 and is disposed outside of the annular rib 48 and preferably aligned with the oppositely disposed tabs 50, 54. Auxiliary tab 58 is attached to a resiliently deflectable portion 59 of the flange which is formed by an elongated slot 57 formed in flange 28. An outwardly extending push-tab is formed on the portion 59 for enabling user movement of tab 58 by rotation of portion 59.

Referring to FIG. 2, the pressure switch assembly 10 of FIG. 1 is shown as installed on a mounting panel 60 which a non-circular, preferably polygonal, aperture 62 formed therein by inserting the tabs 50, 52, 54, 56 oriented in the position shown in dashed outline in FIG. 2 into the aperture 62. The pressure switch and bracket assembly 10 is then rotated approximately ⅛ turn to cause the tabs 50, 52, 54, 56 to engage the edges of the aperture 62 on the upper surface on the panel and to secure the pressure switch onto the panel. As the pressure switch is rotated from the position shown in dashed outline for the tabs, the auxiliary tab 58 is depressed to the position shown in dashed outline by the user lifting tab 61 and rotating portions 57 of the bracket flange 28. When the tabs 50, 52, 54, 56 have been rotated to the position shown in FIG. 2, tab 61 is released and tab 58 snaps into an auxiliary recess and referable an aperture 64 provided in the panel and engages the sides of the recess or aperture thereby locking the pressure switch into the installed position and preventing removal thereof without deflection of auxiliary tab 58 out of the aperture 64 to permit rotation of the assembly 10 with respect to panel 60.

The present invention thus provides a convenient, low cost and reliable way of mounting an adjustable pressure switch having a mounting bracket, an adjustment cam attachment thereto onto a panel from one side of the panel such that the adjustment cam shaft is accessible from the opposite side panel for user adjustment of the pressure switch. The present invention employs the plurality of tabs integrally formed on the mounting bracket which are inserted in a non-circular aperture in the panel and rotated to lock against the aperture edges and surface of the panel and secure the pressure switch in position. An auxiliary tab snaps into a recess on the panel to prevent rotation of the installed pressure switch.

Although the invention has herein above been described with respect to the illustrated embodiment, it will be understood that the invention is capable of modification and variation and is limited only by the following claims.

What is claimed is:

1. A method of mounting a pressure switch having an adjustment member to a panel comprising:

(a) integrally forming a bracket with a mounting flange and a support flange spaced therefrom and attaching the bracket to the pressure switch;

(b) supporting a user moveable cam shaft on said bracket flanges for moving the adjustment member and extending said shaft through the mounting flange;

(c) integrally forming a plurality of tabs on the bracket mounting flange about the cam shaft;

(d) forming a non-circular aperture in said panel;

(e) inserting said shaft and tabs in said mounting aperture and rotating said bracket and engaging the tabs on said panel;

(f) engaging a locking portion of said mounting flange with a portion of the panel to prevent rotation; and, (g) rotating said cam shaft from the from of said panel for adjustment.

2. The method defined in claim 1, wherein said step of forming a bracket includes metal stamping.

3. The method defined in claim 1, wherein said step of disposing a cam shaft includes journalling said cam shaft on said mounting and support flanges for rotation.

4. A method of mounting a pressure switch having an adjustment member to a panel comprising:

(a) stamping an integral metal bracket with a mounting flange and a support flange spaced therefrom and a plurality of tabs on said mounting flange and attaching said bracket to said switch;

(b) journalling a cam shaft for rotation on said support and mounting flange and adjusting said member with said cam shaft;

(c) forming a non-circular aperture in said panel and inserting said tabs and camshaft in said aperture and rotating said tabs and engaging said tabs on said panel;

(d) engaging a portion of said flange with said panel and preventing rotation of said tabs.

5. The method defined in claim 4, wherein said step of stamping said bracket includes forming a spring tab on said mounting flange; and, said step of engaging includes forming an aperture in said panel and inserting said spring tab therein.

* * * * *